US012548519B2

(12) United States Patent
Pyun et al.

(10) Patent No.: US 12,548,519 B2
(45) Date of Patent: Feb. 10, 2026

(54) POWER SUPPLY SYSTEM, DISPLAY DEVICE INCLUDING THE SAME, AND METHOD OF DRIVING THE SAME

(71) Applicant: Samsung Display Co., Ltd., Yongin-Si (KR)

(72) Inventors: Ki Hyun Pyun, Yongin-si (KR); Dae Sik Lee, Yongin-si (KR); Sung Mo Yang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/496,970

(22) Filed: Oct. 30, 2023

(65) Prior Publication Data

US 2024/0282264 A1 Aug. 22, 2024

(30) Foreign Application Priority Data

Feb. 16, 2023 (KR) ........................ 10-2023-0020847

(51) Int. Cl.
*G09G 3/3241* (2016.01)

(52) U.S. Cl.
CPC ..... *G09G 3/3241* (2013.01); *G09G 2330/025* (2013.01); *G09G 2330/04* (2013.01)

(58) Field of Classification Search
CPC ............... G09G 3/3233; G09G 3/3241; G09G 2330/025; G09G 2330/04
See application file for complete search history.

(56) References Cited

U.S. PATENT DOCUMENTS

| | | | | |
|---|---|---|---|---|
| 7,561,124 | B2 | 7/2009 | Kwak et al. | |
| 8,376,802 | B2 | 2/2013 | Kim et al. | |
| 9,082,344 | B2 | 7/2015 | Shin | |
| 11,355,066 | B2 | 6/2022 | Lee et al. | |
| 2009/0109142 | A1* | 4/2009 | Takahara | G09G 3/006 345/76 |
| 2012/0127151 | A1* | 5/2012 | Murakami | G09G 3/3611 345/212 |
| 2014/0176524 | A1* | 6/2014 | Lee | G09G 3/3233 345/212 |
| 2017/0154590 | A1* | 6/2017 | Ahn | G09G 3/3655 |
| 2017/0330502 | A1* | 11/2017 | Jang | G09G 3/2092 |
| 2018/0166020 | A1* | 6/2018 | Hwang | G09G 3/3233 |
| 2020/0273399 | A1* | 8/2020 | Qin | G09G 3/3266 |

(Continued)

FOREIGN PATENT DOCUMENTS

| | | | |
|---|---|---|---|
| KR | 10-0570995 | B1 | 4/2006 |
| KR | 10-0684825 | B1 | 2/2007 |

(Continued)

*Primary Examiner* — Lunyi Lao
*Assistant Examiner* — Sarvesh J Nadkarni
(74) *Attorney, Agent, or Firm* — Innovation Counsel LLP

(57) ABSTRACT

A display device according to embodiments of the present inventive concept includes pixels connected to scan lines, data lines, sensing lines, a first power line, and a second power line; and a power supply unit supplying at least one of a first driving power source, a second driving power source, and a third driving power source to the second power line as a second power source, and the power supply unit supplies voltages of the first driving power source and the third driving power source to the second power line during a normal driving period in which the pixels emit light.

20 Claims, 16 Drawing Sheets

(56) References Cited

U.S. PATENT DOCUMENTS

| | | | | |
|---|---|---|---|---|
| 2021/0233471 | A1* | 7/2021 | Takazane | G09G 3/3233 |
| 2021/0264847 | A1* | 8/2021 | Jeong | G09G 3/32 |
| 2021/0358400 | A1* | 11/2021 | Wang | G09G 3/2096 |
| 2022/0336523 | A1* | 10/2022 | Hsieh | H10H 29/14 |
| 2024/0221653 | A1* | 7/2024 | Kim | G09G 3/3233 |

FOREIGN PATENT DOCUMENTS

| | | | |
|---|---|---|---|
| KR | 10-0686334 | B1 | 2/2007 |
| KR | 10-0741961 | B1 | 7/2007 |
| KR | 10-2021-0086862 | A | 7/2021 |
| KR | 10-2022-0075577 | A | 6/2022 |
| KR | 10-2433041 | B1 | 8/2022 |

* cited by examiner

CS: EN1, EN2, EN3
VSS: VSS1, VSS2, VSS3

< Normal Driving Period >

POWER SUPPLY SYSTEM, DISPLAY DEVICE INCLUDING THE SAME, AND METHOD OF DRIVING THE SAME

CROSS-REFERENCE TO RELATED APPLICATION

The application claims priority to and the benefit of Korean Patent Application No. 10-2023-0020847, filed Feb. 16, 2023, which is hereby incorporated by reference for all purposes as if fully set forth herein.

BACKGROUND

1. Field

The present inventive concept relates to a power supply system, a display device including the same, and a method of driving the same.

2. Discussion

As information technology develops, the importance of a display device, which are a connection medium between a user and information, has been emphasized. In response to this, the use of display devices such as a liquid crystal display device, an organic light emitting display device, and the like has been increasing.

The display device displays an image using data. Here, when the data includes high grayscales, overcurrent exceeding an allowable range may flow through the display device. Accordingly, when overcurrent is expected, data may be scaled down so that a current within an allowable range may flow through the display device.

When a scale factor is applied to data, a scale factor based on data (that is, grayscales) of a previous frame may be applied to a current frame. In this case, in a worst case in which a black image and a white image are switched every frame, overcurrent flowing through the display device cannot be prevented.

SUMMARY

An object of the present inventive concept is to provide a power supply system capable of preventing overcurrent flowing through a display device, a display device including the same, and a method of driving the same.

A display device according to embodiments of the present inventive concept may include pixels connected to scan lines, data lines, sensing lines, a first power line, and a second power line; and a power supply unit supplying at least one of a first driving power source, a second driving power source, and a third driving power source to the second power line as a second power source. The power supply unit may supply voltages of the first driving power source and the third driving power source to the second power line during a normal driving period in which the pixels emit light.

According to an embodiment, the first driving power source may be set to a ground potential (GND).

According to an embodiment, the first power line may receive a voltage of a first power source from an external system.

According to an embodiment, the voltage of the first power source may be a higher voltage than those of the first driving power source and the third driving power source.

According to an embodiment, the power supply unit may supply a voltage of the second driving power source to the second power line during a sensing driving period in which characteristics of the pixels are sensed and supply a voltage of the third driving power source to the second power line during a protective driving period for preventing overcurrent flowing through the first power line.

According to an embodiment, the voltage of the third driving power source may be set higher than that of the first driving power source and lower than that of the second driving power source.

According to an embodiment, the voltage of the second driving power source may be set such that the pixels do not emit light.

According to an embodiment, the voltage of the third driving power source may be set so that the pixels maintain a light emitting state.

According to an embodiment, the power supply unit may include a first transistor connected between the second power line and the first driving power source; a second driving power generator connected to the second power line and supplying the second driving power source; and a third driving power generator connected to the second power line and supplying the third driving power source.

According to an embodiment, the display device may further include a current sensing unit sensing the amount of current of the first power line and outputting an alert signal in response to a sensed result; a load determination unit determining a load of data input from an external system every frame and outputting a load signal corresponding to a determined result; and a timing controller controlling the power supply unit in response to the alert signal and the load signal.

According to an embodiment, when a load included in the load signal exceeds a predetermined threshold value, the timing controller may set the first transistor and the third driving power generator to be in an on state so that the display device is driven in the normal driving period regardless of the alert signal.

According to an embodiment, the current sensing unit may receive a reference current and output an alert signal having an enable level when the amount of current of the first power line is equal to or greater than the reference current.

According to an embodiment, the timing controller may set the third driving power generator to be in an on state so that the display device is driven in the protective driving period for preventing overcurrent flowing through the first power line when the alert signal having the enable level is input and the voltage of the third driving power source is supplied to the second power line.

According to an embodiment, the timing controller may set the second driving power generator to be in an on state so that the voltage of the second driving power source is supplied to the second power line during a sensing driving period in which characteristics of a driving transistor included in the pixels are sensed.

A power supply system according to embodiments of the present inventive concept may include a first transistor disposed between a first driving power source and a power line to supply a first driving power source to a panel; a second driving power generator supplying a second driving power source to the power line; and a third driving power generator supplying a third driving power source to the power line. The third driving power source may have a voltage higher than that of the first driving power source and lower than that of the second driving power source.

According to embodiments of the present inventive concept, a method of driving a display device including pixels that emit light current flows from a first power line to a second power line, may include supplying voltages of a first driving power source and a third driving power source to the second power line during a normal driving period in which the pixels emit light; supplying a voltage of a second driving power source to the second power line during a sensing driving period in which information of a driving transistor included in the pixels is sensed; and supplying a voltage of the third driving power source to the second power line during a protective driving period for preventing overcurrent flowing through the first power line.

According to an embodiment, the voltage of the third driving power source may be higher than that of the first driving power source and lower than that of the second driving power source.

According to an embodiment, the voltages of the first driving power source and the third driving power source may be set such that the pixels emit light, and the voltage of the second driving power source may be set such that the pixels do not emit light.

According to an embodiment, the first driving power source may be set to a ground potential (GND).

According to an embodiment, the method of driving the display device may further include comparing the amount of current flowing through the first power line with a reference current; and driving in the protective driving period when the amount of current of the first power line is equal to or greater than the reference current.

Objects of the present inventive concept are not limited to the objects mentioned above, and other technical objects not mentioned will be clearly understood by those skilled in the art from the description below.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
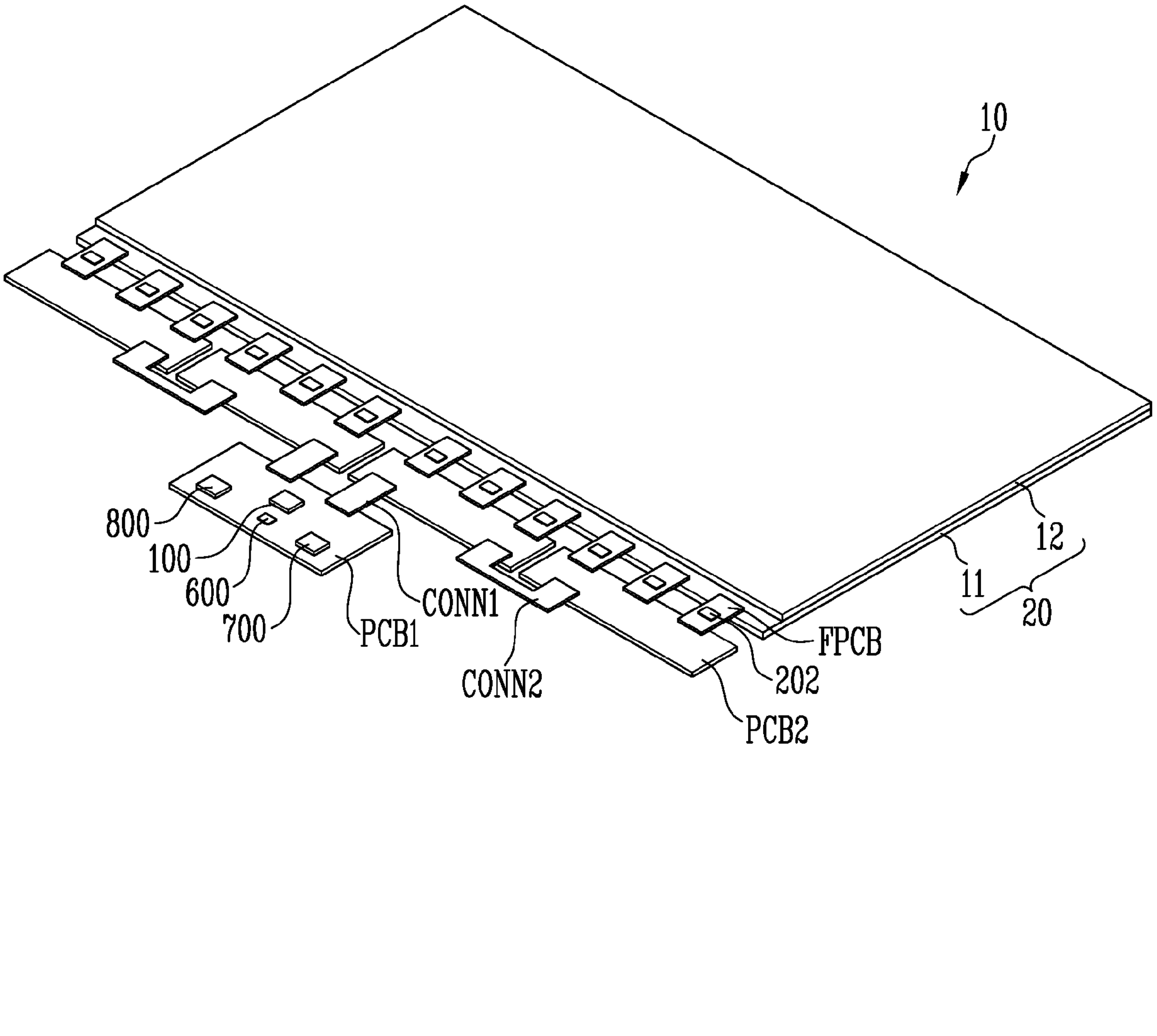
FIG. 1 is a perspective view schematically illustrating a display device according to an embodiment of the present inventive concept.

Hereinafter, various embodiments of the present inventive concept will be described in detail with reference to the accompanying drawings so that those of ordinary skill in the art may easily implement the present inventive concept. The present inventive concept may be embodied in various different forms and is not limited to the embodiments described herein.

In order to clearly describe the present inventive concept, parts that are not related to the description are omitted, and the same or similar components are denoted by the same reference numerals throughout the specification. Therefore, the reference numerals described above may also be used in other drawings.

In addition, the size and thickness of each component shown in the drawings are arbitrarily shown for convenience of description, and thus the present inventive concept is not necessarily limited to those shown in the drawings. In the drawings, thicknesses may be exaggerated to clearly express the layers and regions.

In addition, in the description, the expression "is the same" may mean "substantially the same". That is, it may be the same enough to convince those of ordinary skill in the art to be the same. In other expressions, "substantially" may be omitted.

FIG. 1 is a perspective view schematically illustrating a display device according to an embodiment of the present inventive concept.

Referring to FIG. 1, a display device 10 according to an embodiment of the present inventive concept may include a display unit 20, a flexible circuit board FPCB, a first printed circuit board PCB1, cables CONN1 and CONN2, and a second printed circuit board PCB2.

The display unit 20 may include a lower substrate 11 and an upper substrate 12. The lower substrate 11 may be a thin film transistor substrate made of plastic or glass. The upper substrate 12 may be an encapsulation substrate made of a plastic film, a glass substrate, or a protective film.

Scan lines, data lines, and sensing lines (not shown) may be disposed on the display unit 20. Also, pixels (not shown) may be arranged to be connected to the scan lines, the data lines, and the sensing lines. The pixels may generate light having predetermined luminance in response to data signals from the data lines. Accordingly, a predetermined image may be displayed on the display unit 20.

A timing controller 100, a current sensing unit 600, a load determination unit 700, and a power supply unit 800 (or a power supply system) may be disposed on the first printed circuit board PCB1. The timing controller 100 may control overall driving of the display device 10. The current sensing unit 600 may sense the amount of current of a first power source supplied from an external system (or set). The load determination unit 700 may determine a load of input data supplied from an external system every frame. The power supply unit 800 may generate a second power source and supply the generated second power source to the display unit 20.

Meanwhile, various other components may be disposed on the first printed circuit board PCB1 in addition to the above-described components. As an example, a sensing unit 400 (refer to FIG. 2) electrically connected to the sensing lines may be additionally disposed on the first printed circuit board PCB1. In embodiments of the present inventive concept, for convenience of description, a case in which the timing controller 100, the current sensing unit 600, the load determination unit 700, and the power supply unit 800 are disposed on the first printed circuit board PCB1 is shown as an example.

A data integrated circuit 202 may be mounted on the flexible circuit board FPCB. The data integrated circuit 202 may be connected to some of the data lines disposed on the display unit 20. The data integrated circuit 202 may generate the data signals using output data supplied from the timing controller 100 and supply the generated data signals to the data lines connected thereto.

Flexible circuit boards FPCB may be electrically connected to second printed circuit boards PCB2, and the second printed circuit boards PCB2 may be electrically connected to each other by a second cable CONN2. The second printed circuit boards PCB2 may be electrically connected to the first printed circuit board PCB1 by a first cable CONN1. In this case, the timing controller 100 located on the first printed circuit board PCB1 may be electrically connected to the data integrated circuit 202 via the cables CONN1 and CONN2, the second printed circuit board PCB2, and the flexible circuit board FPCB.

Figure 2:
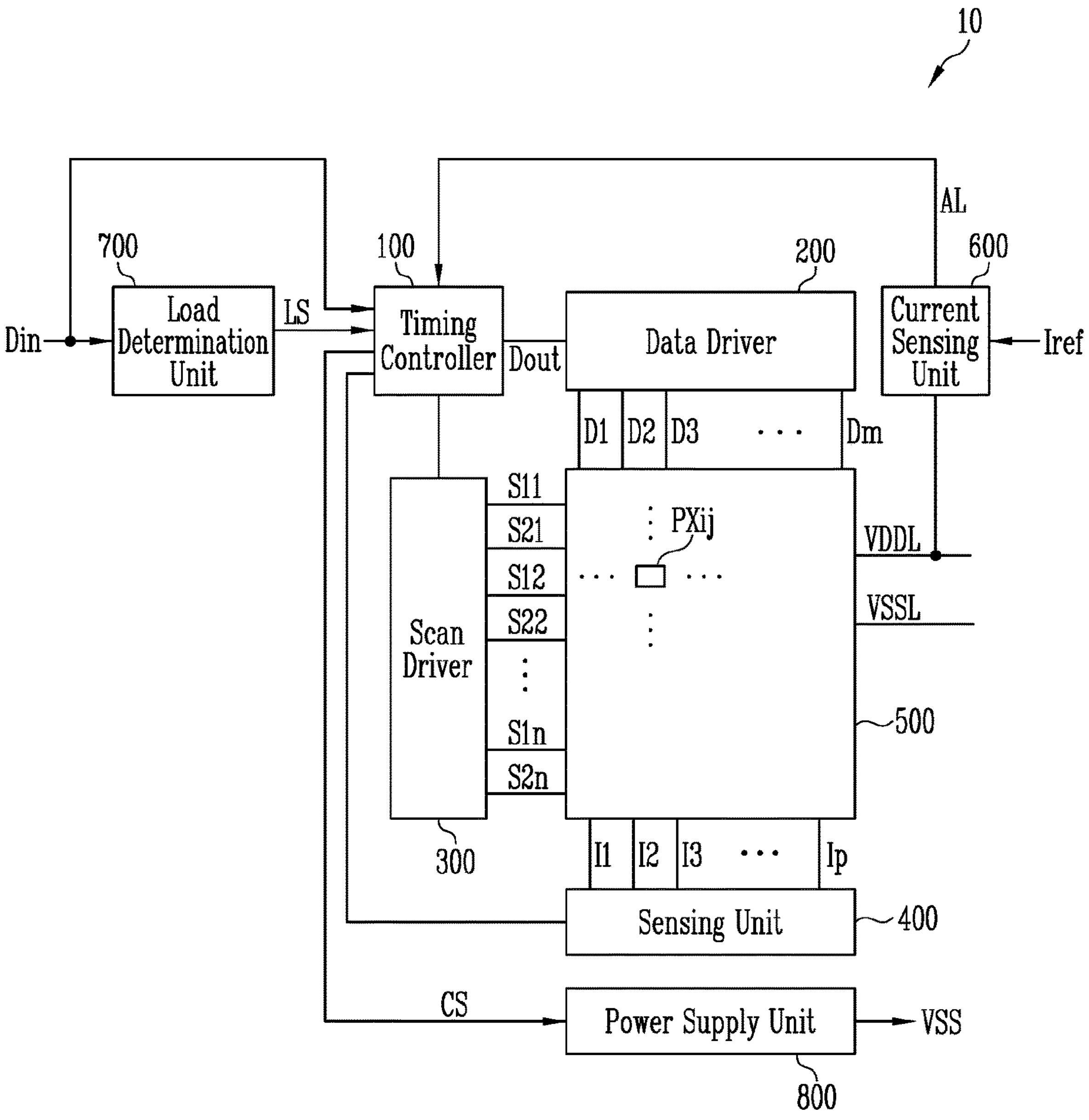
FIG. 2 is a block diagram schematically illustrating the display device according to an embodiment of the present inventive concept.
Figure 3:
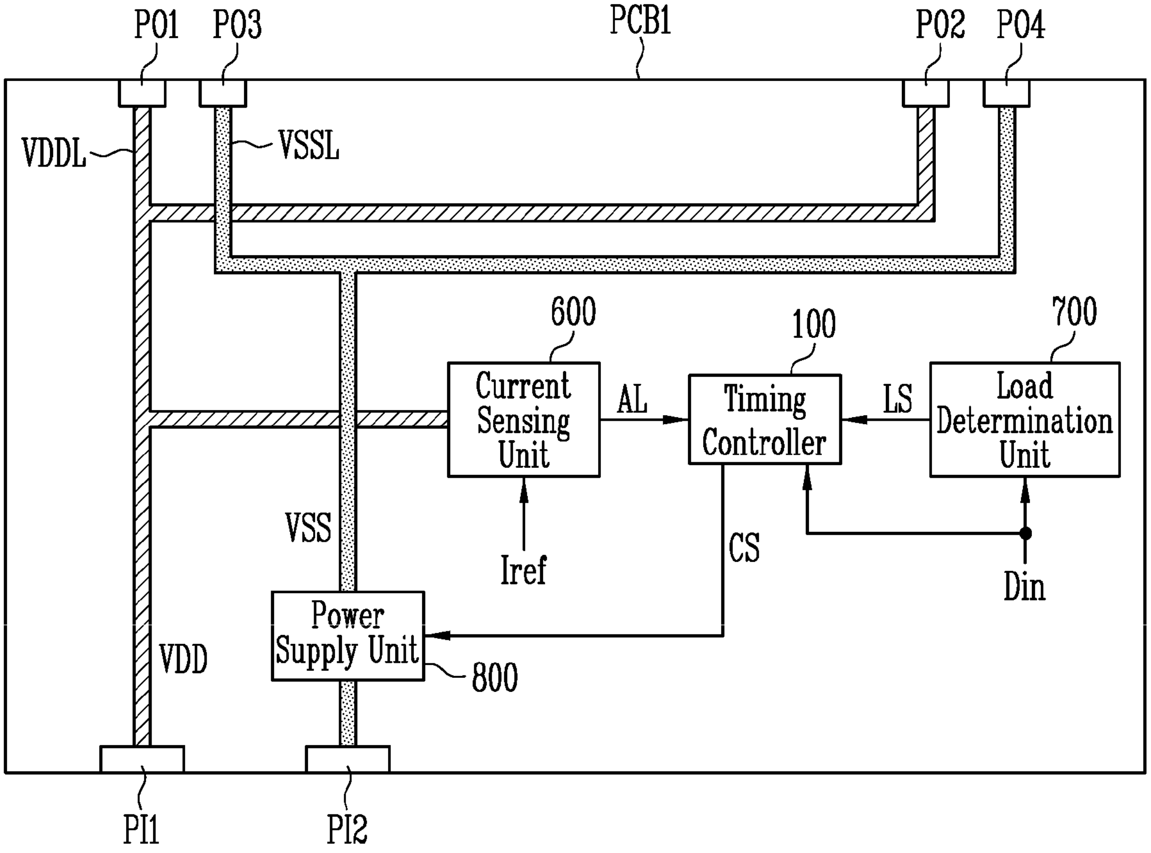
FIG. 3 is a block diagram schematically illustrating an embodiment of a first printed circuit board shown in FIG. 1.

FIG. 2 is a block diagram schematically illustrating the display device according to an embodiment of the present inventive concept. FIG. 3 is a block diagram schematically illustrating an embodiment of a first printed circuit board shown in FIG. 1. FIG. 3 briefly shows only the components necessary for the description of the present inventive concept among various components included in the first printed circuit board.

Referring to FIGS. 2 and 3, the display device 10 according to an embodiment of the present inventive concept may include the timing controller 100, a data driver 200, a scan driver 300, the sensing unit 400, a pixel unit 500, the current sensing unit 600, the load determination unit 700, and the power supply unit 800.

The pixel unit 500 may correspond to all or a partial area of the display unit 20 shown in FIG. 1. The pixel unit 500 includes pixels PX. Each of the pixels PX may be connected to a corresponding data line and a corresponding scan line. Here, a pixel PXij may refer to a pixel connected to an i-th scan line and a j-th data line, where i and j may be natural numbers.

Each of the pixels PX may be connected to a first power line VDDL and a second power line VSSL. The pixels PX may receive a first power source VDD through the first power line VDDL and a second power source VSS through the second power line VSSL. During a normal driving period and a protective driving period, the first power source VDD may have a higher voltage level than the second power source VSS.

Each of the pixels PX may include a plurality of transistors and at least one light emitting element. The pixels PX may be selected when a scan signal is supplied to a scan line connected thereto and may receive a data signal from a data line. Each of the pixels PX receiving the data signal may emit light of a predetermined luminance to the outside in response to the data signal.

The scan driver 300 may supply a first scan signal to first scan lines S11 to S1*n* and a second scan signal to second scan lines S21 to S2*n* in response to a control signal from the timing controller 100, where n may be a natural number. In an embodiment, the scan driver 300 may be integrated on the display unit 20 through the same process as a process for forming the pixels PX. In another embodiment, the scan driver 300 may be configured as a separate integrated circuit and mounted on at least one of the flexible circuit board FPCB, the first printed circuit board PCB1, and the second printed circuit board PCB2.

The scan driver 300 may sequentially supply the first scan signal having a gate-on voltage (or turn-on level) to the first scan lines S11 to S1*n*. Also, the scan driver 300 may sequentially supply the second scan signal having the gate-on voltage to the second scan lines S21 to S2*n*. Meanwhile, FIG. 1 shows an embodiment in which one scan driver 300 drives the first scan lines S11 to S1*n* and the second scan lines S21 to S2*n*, but the present inventive concept is not limited thereto. As an example, the first scan lines S11 to S1*n* and the second scan lines S21 to S2*n* may receive scan signals from different scan drivers, respectively.

When the first scan signals are sequentially supplied, the pixels PX may be selected in units of horizontal lines (or in units of pixel rows), and the data signal may be supplied to the selected pixels PX. When the second scan signals are sequentially supplied, the pixels PX may be selected in units of horizontal lines, and sensing information (for example, threshold voltage and/or mobility information) of driving transistors included the selected pixels PX may be provided to the sensing unit 400.

The data driver 200 may include a plurality of data integrated circuits 202. The data driver 200 may generate data signals (or data voltages) using output data Dout and a control signal input from the timing controller 100, and supply the generated data signals to the data lines D1 to Dm, where m may be a natural number. The data signals supplied to the data lines D1 to Dm may be supplied to the pixels PX selected by one of the first scan signals. To this end, the data driver 200 may supply the data signals to the data lines D1 to Dm in synchronization with the first scan signals.

The sensing unit 400 may supply a voltage of an initialization power source to sensing lines I1 to Ip during a display period (or normal driving period) in which an image is displayed, where p may be a natural number. Also, the sensing unit 400 may receive sensing information from at least one of the sensing lines I1 to Ip during a sensing driving period. Here, the sensing information may include the threshold voltage and/or mobility information of the driving transistor included in the pixel.

The first power line VDDL may be electrically connected to the pixels PX. The first power line VDDL may receive the first power source VDD from the external system (or set) via a first input terminal PI1 of the first printed circuit board PCB1. The external system may generate the first power source VDD using a transformer and supply the generated first power source VDD to the first power line VDDL located on the first printed circuit board PCB1 via the first input terminal PI1.

When the first power source VDD is generated using a transformer, ripple and the like may be minimized in the first power source VDD. Accordingly, the first power source VDD may be stably supplied. In addition, since a component (for example, a DC-DC converter) for generating the first power source VDD is not included in the first printed circuit board PCB1, the size of the first printed circuit board PCB1 can be reduced.

However, when the first power source VDD is generated by an external system, it may be difficult to quickly control a voltage of the first power source VDD in response to overcurrent supplied to the pixels PX. As an example, since the transformer gradually changes a voltage (that is, since the response speed is slow), it may be difficult to quickly drop the voltage of the first power source VDD in response to overcurrent. Therefore, an embodiment of the present inventive concept proposes a configuration of the display device capable of preventing overcurrent by controlling a voltage of the second power source VSS.

The first power line VDDL may be electrically connected to the pixels PX of the pixel unit 500 via the cables CONN1 and CONN2 electrically connected to a first output terminal PO1 and a second output terminal PO2, the second printed circuit board PCB2, and the flexible circuit boards FPCB. Additionally, FIG. 3 shows an embodiment in which the first printed circuit board PCB1 receives the first power source VDD from an external system through the first input terminal PI1 and outputs the first power source VDD through the first output terminal PO1 and the second output terminal PO2, but the present inventive concept is not limited thereto. As an example, the first power line VDDL receiving the first power source VDD may be connected to at least one input terminal and at least one output terminal.

The current sensing unit 600 may be electrically connected to the first power line VDDL. The current sensing unit 600 may sense a current of the first power line VDDL. Here, the current of the first power line VDDL may correspond to the amount of current supplied to the pixels PX. The current sensing unit 600 may sense the amount of current of the first power line VDDL and compare the sensed current with a reference current Iref.

The reference current Iref may be experimentally set as a current value serving as a reference for overcurrent. As an example, when the current of the first power line VDDL is equal to or greater than the reference current Iref, it may be determined that overcurrent flows through the first power line VDDL. The current sensing unit 600 may output an alert signal AL having an enable level when the current sensed from the first power line VDDL is equal to or greater than the reference current Iref. Here, the alert signal AL having the enable level may have a low level voltage. That is, the current sensing unit 600 may output the alert signal AL having the enable level when it is determined that the overcurrent is supplied to the pixels PX.

The current sensing unit 600 may output an alert signal AL having a disable level when the current sensed from the first power line VDDL is less than the reference current Iref. Here, the alert signal AL having the disable level may be set to a high level voltage. In an embodiment, the alert signal AL having the disable level may be set to have a low level voltage as a signal for sensing a current state. The current sensing unit 600 may output the alert signal AL having the disable level when an allowable current is supplied to the pixels PX, that is, when the allowable current flows through the first power line VDDL.

The load determination unit 700 may receive input data Din from an external system and determine a load in unit of frames in response to the input data Din. The load determined by the load determination unit 700 may be included in a load signal LS and the load signal LS may be supplied to the timing controller 100. Various configurations for determining the load of a frame are known, and the load determination unit 700 may be set to one of various known configurations. As an example, the load determination unit 700 may be set as a Net Power Control (NPC) block.

The power supply unit 800 may receive a predetermined power source from an external system via a second input terminal PI2 and generate the second power source VSS using the predetermined power source. The second power source VSS generated by the power supply unit 800 may be supplied to the second power line VSSL.

The second power line VSSL may be electrically connected to the pixels PX. The second power line VSSL may receive the second power source VSS from the power supply unit 800, and may be electrically connected to the pixels PX of the pixel unit 500 via the cables CONN1 and CONN2 electrically connected to a third output terminal PO3 and a fourth output terminal PO4, the second printed circuit board PCB2, and the flexible circuit board FPCB. Additionally, FIG. 3 shows an embodiment in which the second power line VSSL is connected to the third output terminal PO3 and the fourth output terminal PO4, but the present inventive concept is not limited thereto. As an example, the second power line VSSL may be connected to at least one output terminal.

In addition, FIG. 3 shows an embodiment in which the second power source VSS is generated by the power supply unit 800, but the present inventive concept is not limited thereto. As an example, the power supply unit 800 may additionally generate various power sources required to drive the display device 10. In the present inventive concept, only components for generating the second power source VSS among various components constituting the power supply unit 800 are shown.

The timing controller 100 may receive input data Din and a control signal from an external system. As an example, the timing controller 100 may receive the input data Din and the control signal from at least one of a graphics processing unit (GPU), a central processing unit (CPU), an application processor (AP), and the like included in the external system. The control signal may include a synchronization signal, a clock signal, and the like. Also, the input data Din may have predetermined grayscales and may be input every frame.

The timing controller 100 may correct the input data Din to generate output data Dout, and supply the generated output data Dout to the data driver 200. In an embodiment, the timing controller 100 may correct the input data Din in response to an optical measurement result measured during a process. In an embodiment, the timing controller 100 may correct the input data Din using the threshold voltage and/or mobility information of the driving transistor included in each of the pixels PX.

The timing controller 100 may receive the alert signal AL from the current sensing unit 600 and receive the load signal LS from the load determination unit 700. The alert signal AL having the disable level may mean that an allowable current is supplied to the pixels PX. When the alert signal AL having the disable level is input, the timing controller 100 may control the power supply unit 800 so that an image may be displayed in the pixel unit 500. In this case, the power supply unit 800 may control the voltage of the second power source VSS to have a voltage in a normal driving.

The alert signal AL having the enable level may mean that an overcurrent is supplied to the pixels PX. When the alert signal AL having the enable level is input, the timing controller 100 may control the power supply unit 800 so that the current supplied to the pixels PX is reduced. In this case, the power supply unit 800 may control the voltage of the second power source VSS to have a voltage in a protective driving. The second power source VSS output from the power supply unit 800 during the protective driving period may be set to a higher voltage than the second power source VSS output from the power supply unit 800 during the normal driving period.

The load signal LS may include load information of one frame. The timing controller 100 may control driving of the power supply unit 800 by comparing a load value included in the load signal LS with a threshold value stored in advance. In an embodiment, when the load value is below the threshold value, the timing controller 100 may control the driving of the power supply unit 800 in response to the alert signal AL. In an embodiment, when the load value exceeds the threshold value, the timing controller 100 may control the power supply unit 800 to be driven in the normal driving regardless of the alert signal AL.

More specifically, the load value included in the load signal LS may correspond to the load value of a previous frame. When the load value exceeds the threshold value, it may mean that the load of the previous frame was set high and an overcurrent was supplied to the first power line VDDL in the previous frame. Therefore, even if the load of the current frame is set higher than that of the previous frame, the amount of current additionally supplied to the first power line VDDL may not be large. Accordingly, the timing controller 100 may control the power supply unit 800 to be driven in the normal driving regardless of the alert signal AL.

In addition, when the load value exceeds the threshold value, a luminance reversal phenomenon can be prevented when the power supply unit 800 is maintained in the normal driving. As an example, all pixels may emit light at 240 grayscales in the previous frame and all pixels may emit light at 255 grayscales in the current frame. In this case, the current sensing unit 600 may determine that the current of the current frame exceeds the reference current Iref and may supply the alert signal AL having the enable level to the timing controller 100.

Here, when the timing controller 100 drives the power supply unit 800 in a protective driving method, the luminance of the current frame may be lower than that of the previous frame. Accordingly, in an embodiment of the present inventive concept, the timing controller 100 may control the power supply unit 800 to be driven in the normal driving when the load value exceeds the threshold value. Accordingly, the luminance reversal phenomenon can be prevented. Meanwhile, the threshold value may be experimentally determined in consideration of a panel size, resolution, and the like. As an example, the threshold value may be set to correspond to a load of 50% or more, for example, a load of 75%.

Figure 4:
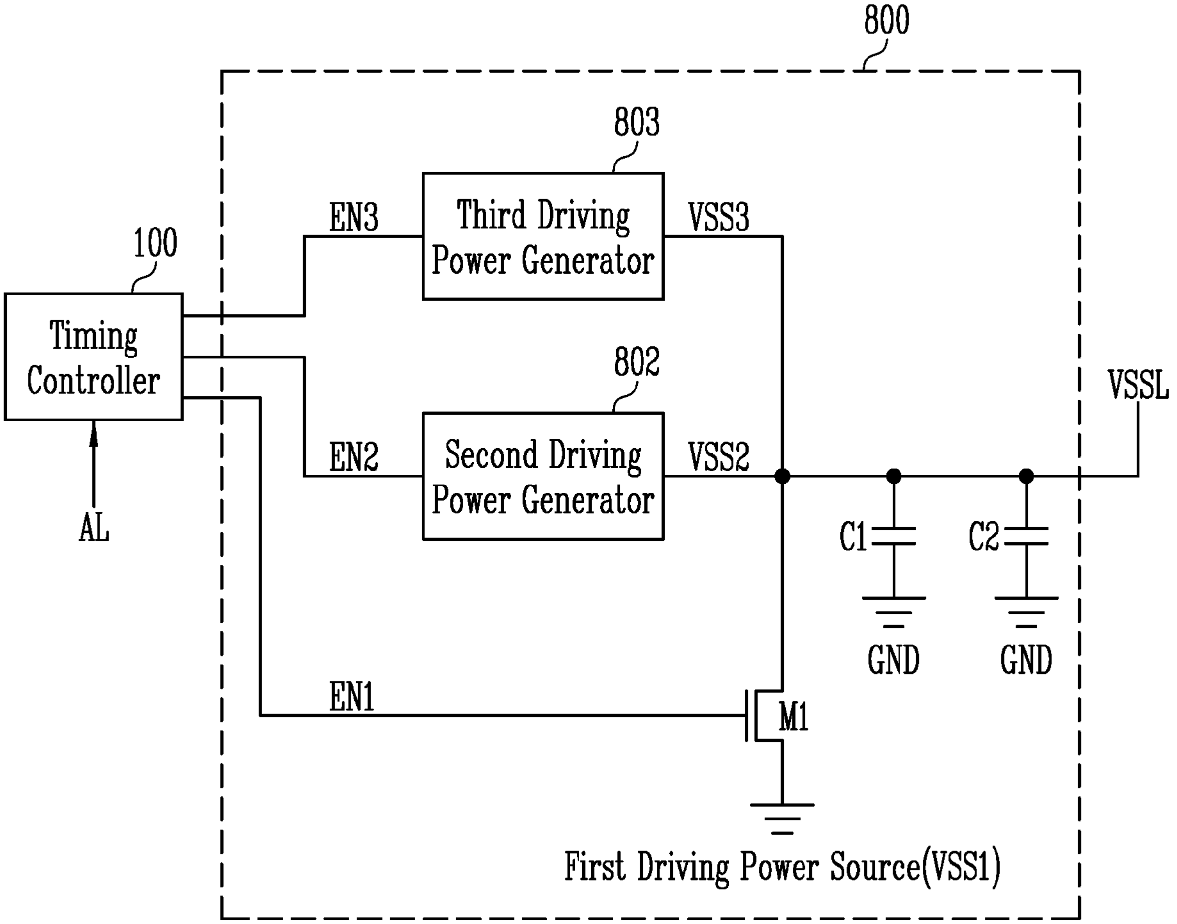
FIG. 4 is a diagram illustrating an embodiment of the configuration of a power supply unit shown in FIGS. 2 and 3 and a timing controller.

FIG. 4 is a diagram illustrating an embodiment of the configuration of a power supply unit shown in FIGS. 2 and 3 and a timing controller. In the following description, the expression "a control signal EN1, EN2, or EN3 is supplied" may mean a state in which a transistor M1 or a driving power generator 802 or 803 supplied with the control signal EN1, EN2, or EN3 supplies a driving power source VSS1, VSS2, or VSS3. In addition, the expression "a control signal EN1, EN2, or EN3 is not supplied" may mean a state in which a transistor M1 or a generator 802 or 803 does not supply the driving power source VSS1, VSS2, or VSS3.

Referring to FIG. 4, the power supply unit 800 according to an embodiment of the present inventive concept may include a first transistor M1, a second driving power generator 802, a third driving power generator 803, and capacitors C1 and C2.

The first transistor M1 may be connected between the second power line VSSL and a first driving power source VSS1. The first transistor M1 may be turned on when a first control signal EN1 is supplied from the timing controller 100 and turned off in other cases. When the first transistor M1 is turned on, a voltage of the first driving power source VSS1 may be supplied to the second power line VSSL as the second power source VSS. Here, the first driving power source VSS1 may be a voltage supplied during the normal driving period, and the pixels PX may display an image normally when the first driving power source VSS1 is supplied.

The first driving power source VSS1 may be set to various voltage values so that a light emitting element LD (refer to FIG. 12) included in each of the pixels PX generates light with a predetermined luminance. As an example, the first driving power source VSS1 may be set to a ground potential GND. Hereinafter, for convenience of description, it is assumed that the first driving power source VSS1 is set to the ground potential GND.

The second driving power generator 802 may generate a second driving power source VSS2 when a second control signal EN2 is supplied from the timing controller 100 and supply the second driving power source VSS2 to the second power line VSSL. The second driving power generator 802 may supply a voltage of the second driving power source VSS2 to the second power line VSSL during the sensing driving period of the pixels PX in response to the control of the timing controller 100. Here, a voltage value of the second driving power source VSS2 may be set such that the pixels PX do not emit light. In this case, the second driving power source VSS2 may be set to a higher voltage than the first driving power source VSS1.

As an example, the voltage of the second driving power source VSS2 may be set so that current does not flow (that is, light is not generated) through the light emitting element LD included in each of the pixels PX. The second driving power source VSS2 may be supplied during the sensing driving period set in advance and may not require a high current. Accordingly, the second driving power generator 802 may be implemented as an amplifier or the like.

The third driving power generator 803 may generate a third driving power source VSS3 when a third control signal EN3 is supplied from the timing controller 100 and supply the third driving power source VSS3 to the second power line VSSL. The third driving power generator 803 may supply a voltage of the third driving power source VSS3 to the second power line VSSL during the protective driving period in which an overcurrent is supplied to the pixels PX in response to the control of the timing controller 100.

When the third driving power source VSS3 is supplied to the second power line VSSL, the amount of current flowing through the pixels PX can be reduced because a voltage difference between the first power line VDDL and the second power line VSSL may be reduced. Accordingly, an abrupt increase in the amount of current flowing through the pixel unit 500 can be prevented (that is, overcurrent can be prevented). As an example, in an embodiment of the present inventive concept, as the third driving power source VSS3 is supplied to the second power line VSSL during the protective driving period, the current supplied to the pixels PX (that is, the current of the first power line VDDL) can be prevented from exceeding the reference current Iref.

A voltage value of the third driving power source VSS3 may be set so that the pixels PX maintain a light emitting state. As an example, the third driving power source VSS3 may be set to a voltage value lower than that of the second driving power source VSS2 and higher than that of the first driving power source VSS1. In this case, the light emitting state of the pixels PX may be maintained during the protective driving period. Accordingly, an image may be continuously displayed in the pixel unit 500.

During the protection driving period, the third driving power source VSS3 may quickly increase a voltage of the second power line VSSL. To this end, the third driving power generator 803 may be set as a driver having a high current specification. As an example, the third driving power generator 803 may be implemented as a buck converter. In an embodiment, the third driving power generator 803 may be implemented as a boost converter or a buck-boost converter.

The third driving power generator 803 may supply the voltage of the third driving power source VSS3 to the second power line VSSL during the normal driving period. That is, during the normal driving period, voltages of the first driving power source VSS1 and the third driving power source VSS3 may be supplied to the second power line VSSL. The third driving power source VSS3 supplied during the normal driving period may be discharged to the first driving power source VSS1 set to a low voltage. Accordingly, during the normal driving period, the second power line VSSL may maintain the voltage of the first driving power source VSS1.

Meanwhile, when the voltage of the third driving power source VSS3 is supplied to the second power line VSSL using the third driving power generator 803 during the normal driving period, there is an advantage in that the voltage of the second power line VSSL can be quickly risen to the voltage of the third driving power source VSS3 in response to the alert signal having the enable level.

Each of a first capacitor C1 and a second capacitor C2 may be connected between the ground potential GND and the second power line VSSL. The first capacitor C1 and the second capacitor C2 may stabilize the voltage of the second power line VSSL.

The timing controller 100 may selectively supply one of the first control signal EN1, the second control signal EN2, and the third control signal EN3 to the power supply unit 800. The first control signal EN1, the second control signal EN2, and the third control signal EN3 may be a signal included in the control signal CS shown in FIGS. 2 and 3. The timing controller 100 may selectively supply one of the second control signal EN2, or the first control signal EN1 and the third control signal EN3 to the power supply unit 800.

In an embodiment, during the normal driving period in which an image is displayed in the pixel unit 500, the timing controller 100 may supply the first control signal EN1 to the first transistor M1 or the first control signal EN1 and the third control signal EN3 to the first transistor M1 and the third driving power generator 803, respectively. In an embodiment, during the protective driving period for preventing overcurrent, the timing controller 100 may exclusively supply the third control signal EN3 to the third driving power generator 803. In an embodiment, during the sensing driving period in which the characteristics of the pixels PX are sensed, the timing controller 100 may exclusively supply the second control signal EN2 to the second driving power generator 802.

Figure 5:
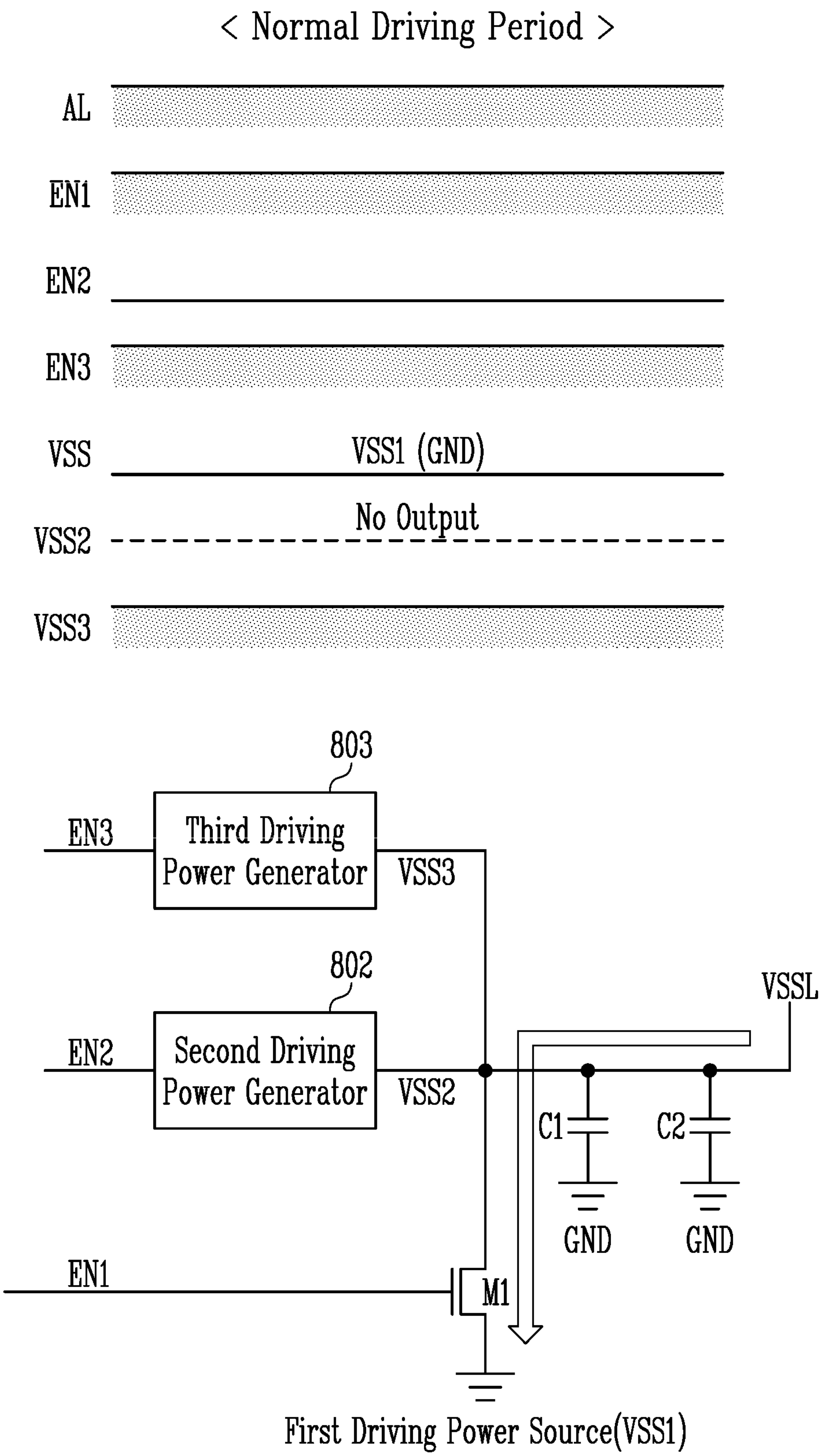
FIG. 5 is a diagram illustrating an embodiment of a process in which the power supply unit operates during a normal driving period in which an image is displayed in a pixel unit.

FIG. 5 is a diagram illustrating an embodiment of a process in which the power supply unit operates during a normal driving period in which an image is displayed in a pixel unit.

Referring to FIG. 5, during the normal driving period, the current sensing unit 600 may supply the alert signal AL having the disable level to the timing controller 100. In this case, the timing controller 100 may supply the first control signal EN1 to the first transistor M1 and the third control signal EN3 to the third driving power generator 803 in response to the normal driving and not supply the second control signal EN2 to the second driving power generator 802.

When the first control signal EN1 is supplied, the first transistor M1 may be turned on. When the first transistor M1 is turned on, the voltage (for example, the ground potential GND) of the first driving power source VSS1 may be supplied to the second power line VSSL.

When the third control signal EN3 is supplied, the voltage of the third driving power source VSS3 may be supplied to the second power line VSSL from the third driving power generator 803. In this case, the third driving power source VSS3 may be set to a higher voltage than the first driving power source VSS1. Accordingly, the voltage of the third driving power source VSS3 may be discharged to the first driving power source VSS1. Therefore, during the normal driving period, the voltage of the second power line VSSL may maintain the first driving power source VSS1, and the first driving power source VSS1 may be supplied to the second power line VSSL as the second power source VSS.

Meanwhile, during the normal driving period, the third driving power source VSS3 may be supplied to the second power line VSSL from the third driving power generator 803. Accordingly, when an overcurrent is supplied to the pixels PX (that is, when the alert signal AL having the enable level is input to the timing controller 100), the voltage of the second power line VSSL may rise to the voltage of the third driving power source VSS3 within a short time.

Figure 6:
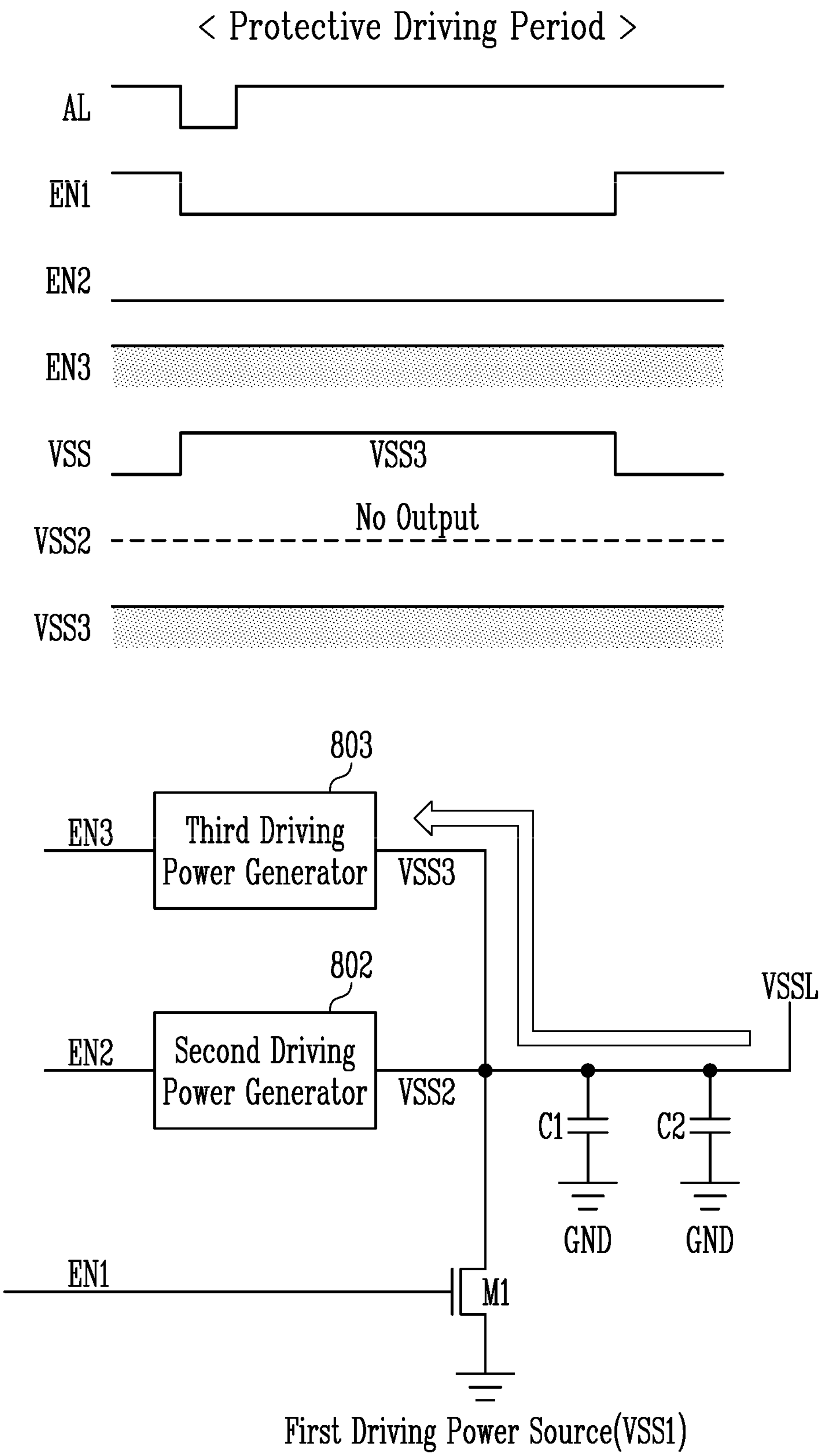
FIG. 6 is a diagram illustrating an embodiment of a process in which the power supply unit operates during a protective driving period for preventing overcurrent.

FIG. 6 is a diagram illustrating an embodiment of a process in which the power supply unit operates during a protective driving period for preventing overcurrent.

Referring to FIG. 6, during the normal driving period, the current sensing unit 600 may sense the current of the first power line VDDL and generate the alert signal AL. The current sensing unit 600 may supply the alert signal AL having the disable level (high level) to the timing controller 100 when the current of the first power line VDDL is less than the reference current Iref. In this case, the normal driving period may be maintained.

The current sensing unit 600 may supply the alert signal AL having the enable level (low level) to the timing controller 100 when the current of the first power line VDDL is equal to or greater than the reference current Iref. When the alert signal AL having the enable level is input, the timing controller 100 may stop the supply of the first control signal EN1 and maintain the supply of the third control signal EN3.

When the supply of the first control signal EN1 is stopped, the first transistor M1 may be turned off. In this case, electrical connection between the first driving power source VSS1 and the second power line VSSL may be cut off. When the third control signal EN3 is supplied to the third driving power generator 803, the third driving power generator 803 may supply the voltage of the third driving power source VSS3 to the second power line VSSL. Then, during the protective driving period, the voltage of the second power line VSSL may quickly rise to the voltage of the third driving power source VSS3.

During the protective driving period, when the voltage of the second power line VSSL rises to the third driving power source VSS3 higher than the first driving power source VSS1, the amount of current flowing through the pixels PX may be reduced. When the amount of current flowing through the pixels PX is reduced, the amount of current flowing through the first power line VDDL may also be reduced. Accordingly, overcurrent flowing through the pixel unit 500 can be prevented.

Figure 7:
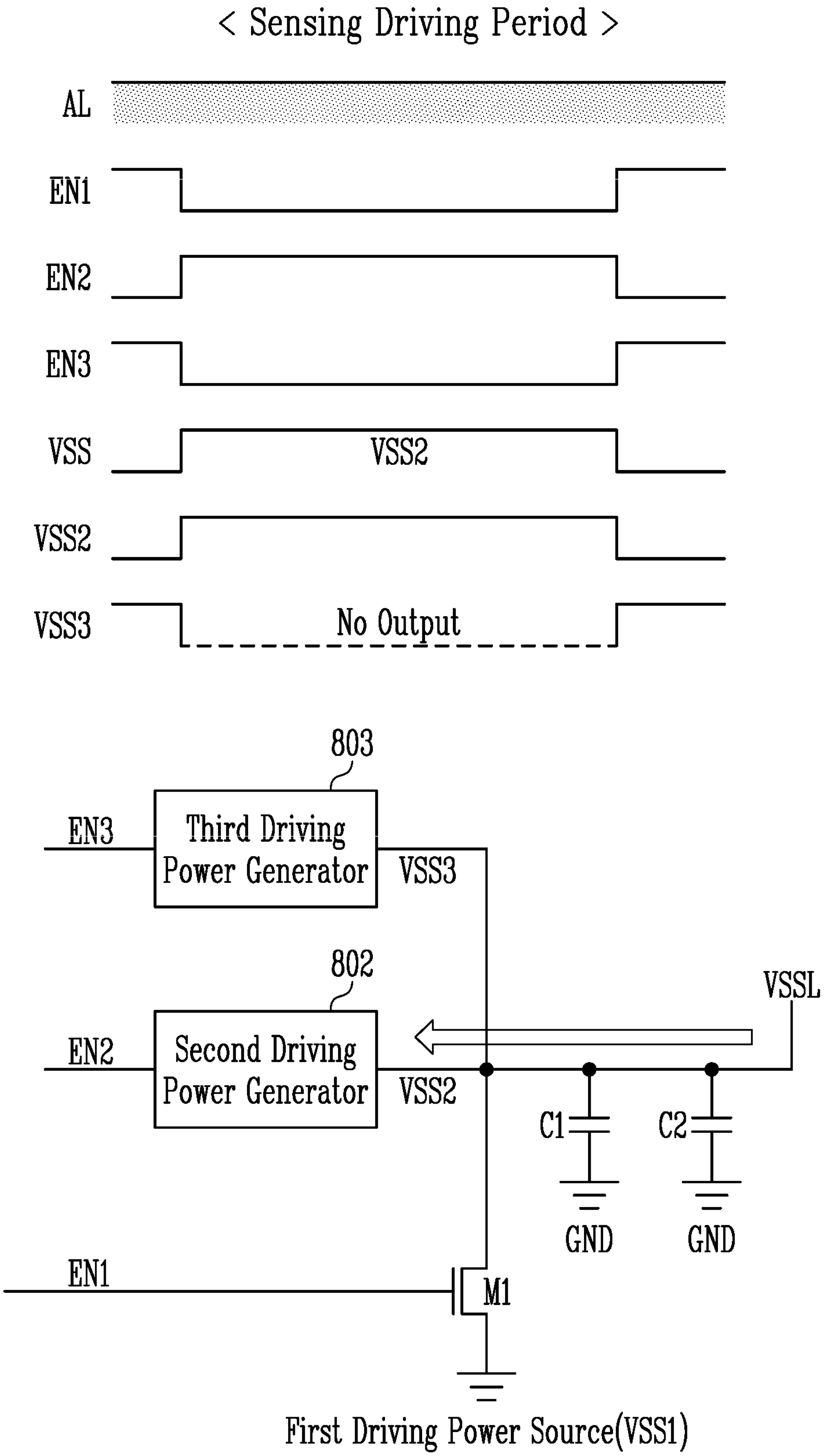
FIG. 7 is a diagram illustrating an embodiment of a process in which the power supply unit operates during a sensing driving period.

FIG. 7 is a diagram illustrating an embodiment of a process in which the power supply unit operates during a sensing driving period.

Referring to FIG. 7, during the sensing driving period, the timing controller 100 may exclusively supply the second control signal EN2 to the second driving power generator 802. When the second control signal EN2 is supplied, the second driving power generator 802 may supply the voltage of the second driving power source VSS2 to the second power line VSSL. In this case, since the first transistor M1 and the third driving power generator 803 are set to an off state, the voltage of the second power line VSSL may rise to the voltage of the second driving power source VSS2. When the voltage of the second power line VSSL is set to the second driving power source VSS2, the light emitting element LD included in each of the pixels PX may be in a non-light emitting state.

Figure 8:
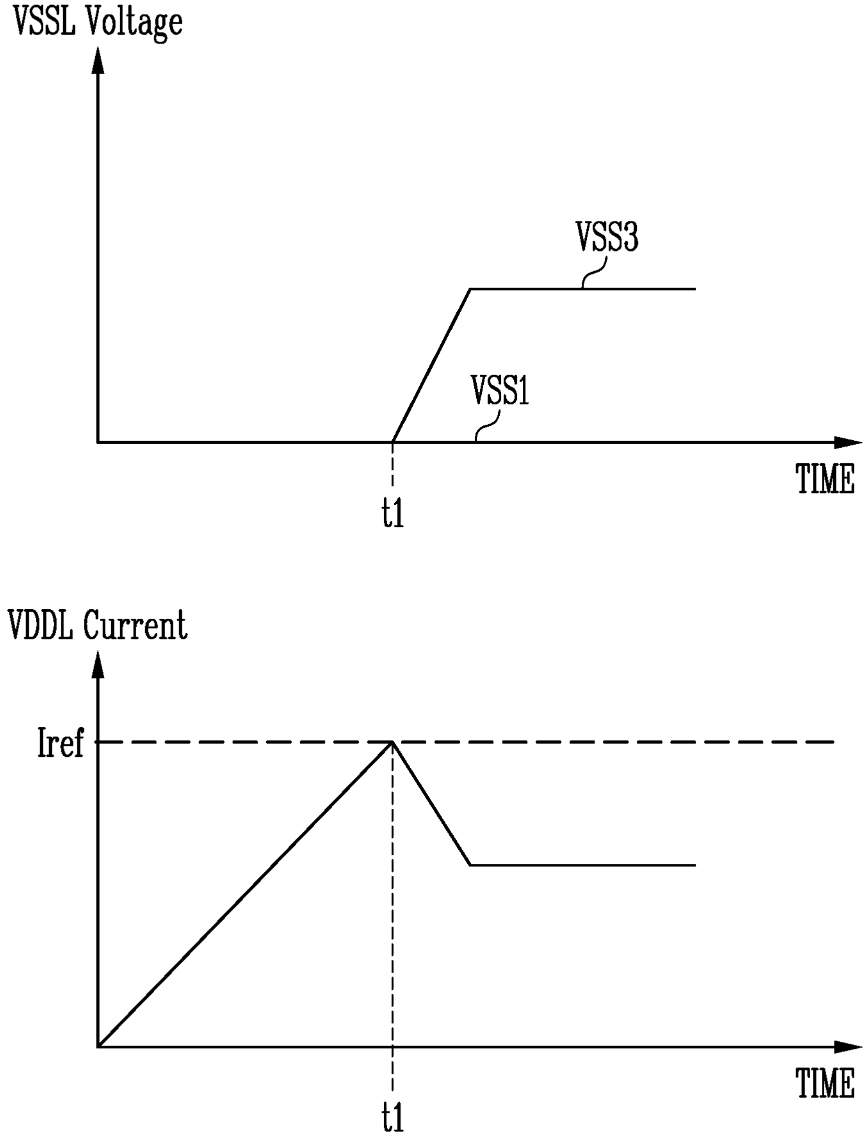
FIG. 8 is a diagram illustrating a current of a first power line and a voltage of a second power line during the protective driving period.

FIG. 8 is a diagram illustrating a current of a first power line and a voltage of a second power line during the protective driving period. In FIG. 8, a time period before a first time point t1 may be the normal driving period and a time period after the first time point t1 may be the protective driving period.

Referring to FIG. 8, before the first time point t1, the voltage of the second power line VSSL may be set to the voltage of the first driving power source VSS1. Also, before the first time point t1, the current of the first power line VDDL may be gradually increased in response to a grayscale or the like. Also, at the first time point t1, the current of the first power line VDDL may be equal to the reference current Iref.

When the current of the first power line VDDL is equal to or greater than the reference current Iref, the alert signal AL having the enable level may be supplied to the timing controller 100, and the timing controller 100 may operate the power supply unit 800 in a protective driving mode (that is, the protective driving period). In this case, after the first time point t1, the voltage of the second power line VSSL may quickly rise to the voltage of the third driving power source VSS3. When the voltage of the second power line VSSL rises to the voltage of the third driving power source VSS3, the current of the first power line VDDL may be reduced (that is, reduced below the reference current Iref). Accordingly, overcurrent supplied to the pixels PX can be prevented.

Figure 9:
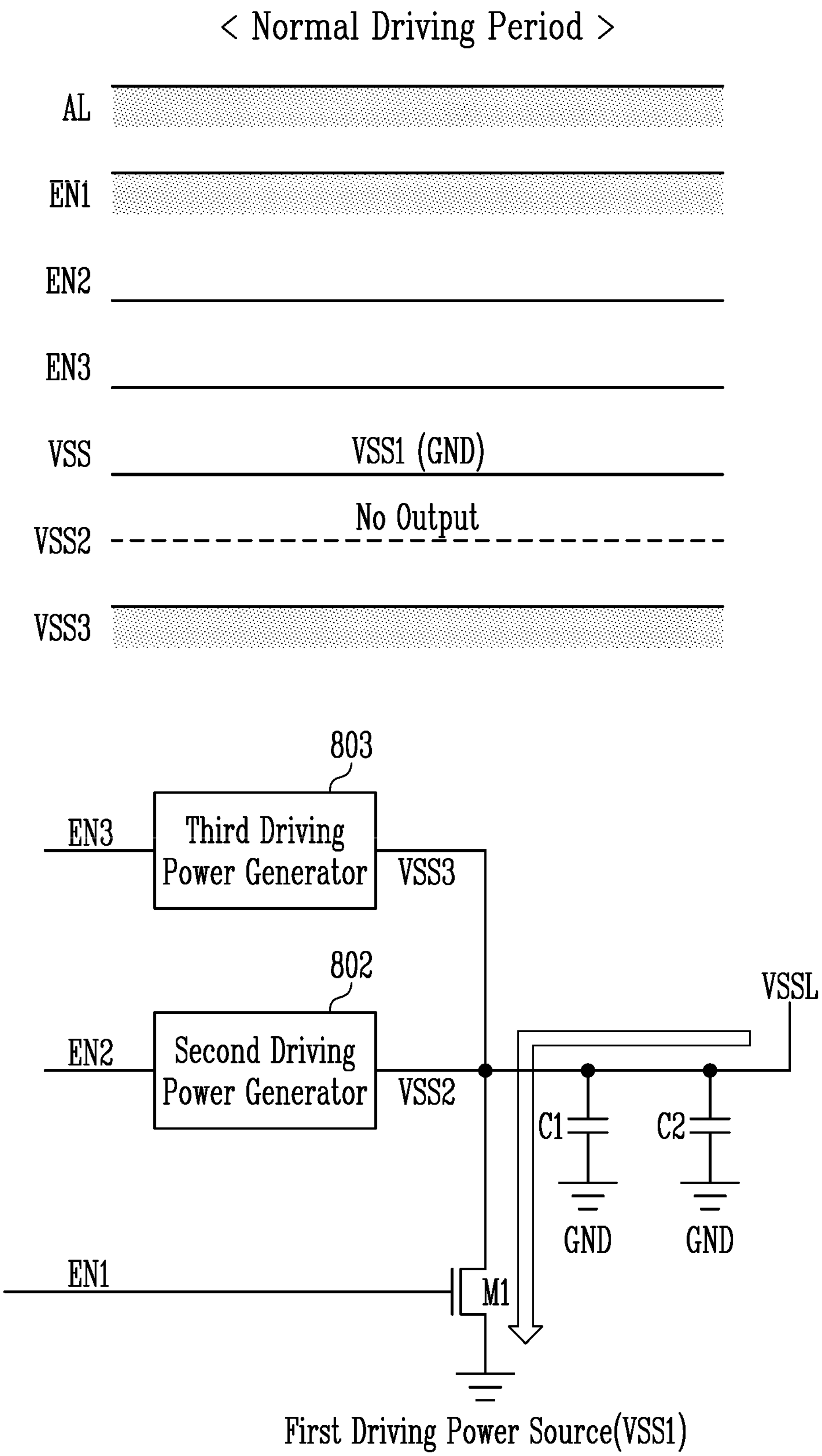
FIG. 9 is a diagram illustrating an embodiment of a process in which the power supply unit operates during the normal driving period in which an image is displayed in a pixel unit.

FIG. 9 is a diagram illustrating an embodiment of a process in which the power supply unit operates during the normal driving period in which an image is displayed in a pixel unit. In describing FIG. 9, detailed descriptions of configurations overlapping those of FIG. 5 will be omitted.

Referring to FIG. 9, during the normal driving period, the timing controller 100 may supply the first control signal EN1 to the first transistor M1. When the first control signal EN1 is supplied to the first transistor M1, the first transistor M1 may be turned on. When the first transistor M1 is turned on, the voltage (for example, the ground potential GND) of the first driving power source VSS1 may be supplied to the second power line VSSL.

Additionally, in FIG. 9, the third control signal EN3 may not be supplied during the normal driving period, and accordingly, the third driving power generator 803 may be set to an off state. Then, during the normal driving period, the third driving power source VSS3 may not be supplied to the second power line VSSL, and thus power consumption may be reduced.

Figure 10:
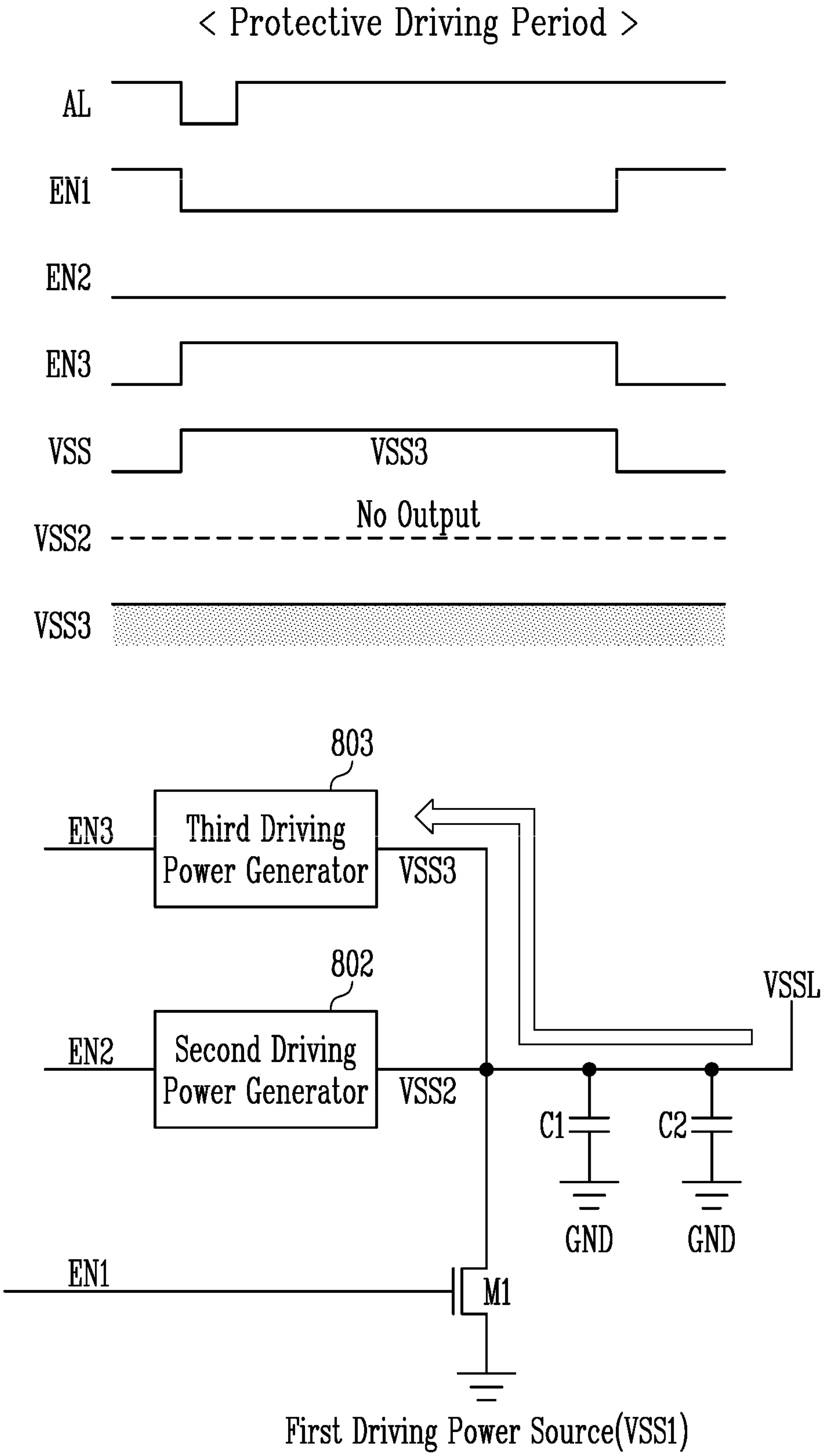
FIG. 10 is a diagram illustrating a process in which the power supply unit operates during the protective driving period for preventing overcurrent.

FIG. 10 is a diagram illustrating a process in which the power supply unit operates during the protective driving period for preventing overcurrent.

Referring to FIG. 10, during the protective driving period, the timing controller 100 may supply the third control signal EN3 to the third driving power generator 803. When the third control signal EN3 is supplied, the third driving power generator 803 may supply the voltage of the third driving power source VSS3 to the second power line VSSL. Then, during the protective driving period, the voltage of the second power line VSSL may quickly rise to the voltage of the third driving power source VSS3.

During the protective driving period, when the voltage of the second power line VSSL rises to the third driving power source VSS3 higher than the first driving power source VSS1, the amount of current flowing through the pixels PX may be reduced. When the amount of current flowing through the pixels PX is reduced, the amount of current flowing through the first power line VDDL may also be reduced. Accordingly, overcurrent flowing through the pixel unit 500 can be prevented.

Figure 11A:
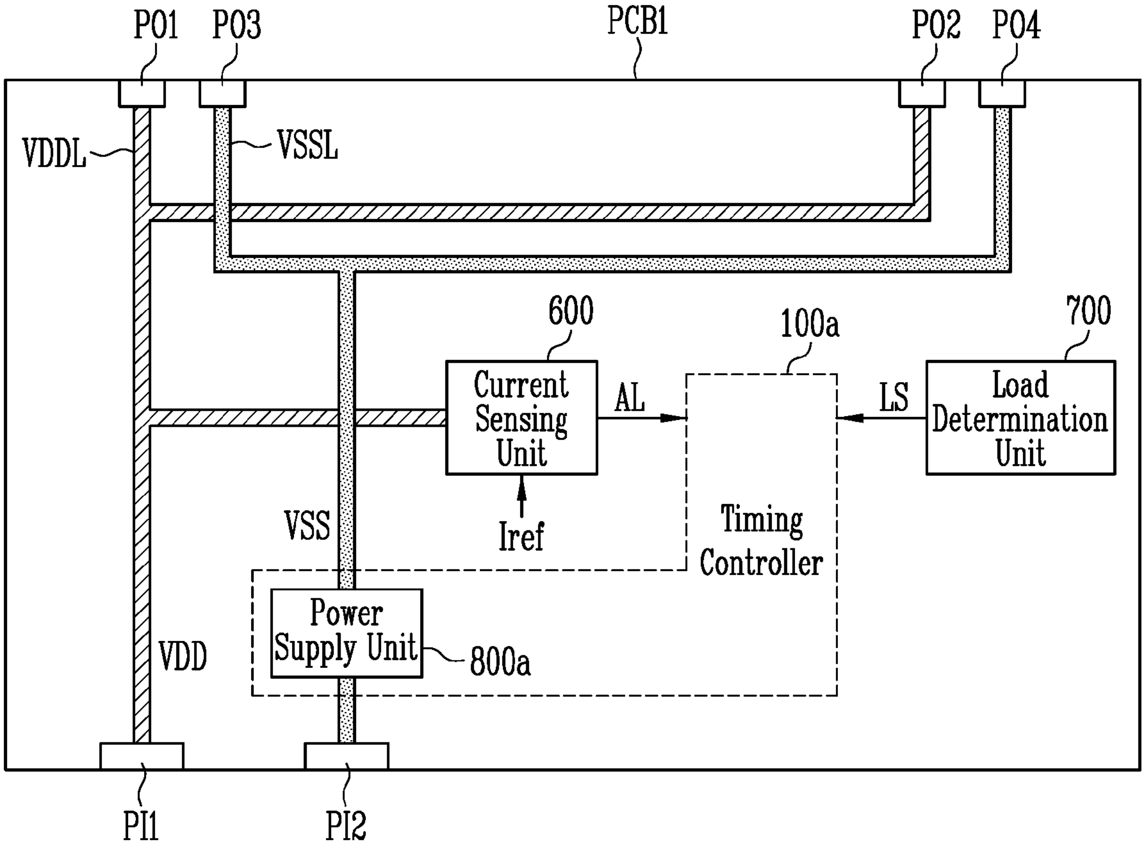
FIGS. 11A and 11B are block diagrams schematically illustrating an embodiment of the first printed circuit board shown in FIG. 1.
Figure 11B:
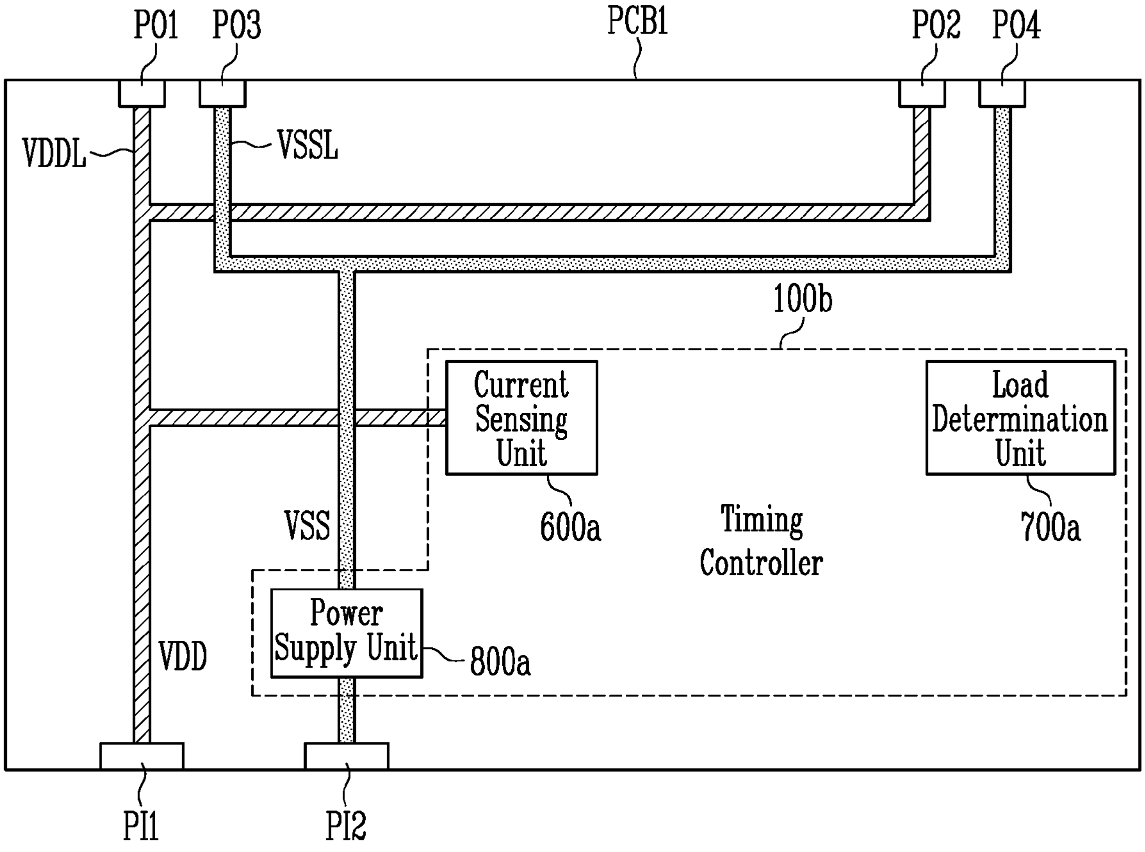

FIGS. 11A and 11B are block diagrams schematically illustrating an embodiment of the first printed circuit board shown in FIG. 1. In describing FIGS. 11A and 11B, detailed descriptions of configurations overlapping those of FIG. 3 will be omitted.

Referring to FIG. 11A, a timing controller 100*a* may include all or at least part of a power supply unit 800*a*. As an example, the timing controller 100*a* may be implemented as an integrated circuit or the like to include all or at least a part of the power supply unit 800*a*.

Referring to FIG. 11B, a timing controller 100*b* may include all or at least part of a current sensing unit 600*a* and a load determination unit 700*a*. As an example, the timing controller 100*b* may be implemented as an integrated circuit or the like to include all or at least a part of each of the power supply unit 800*a*, the current sensing unit 600*a*, and the load determination unit 700*a*.

Figure 12:
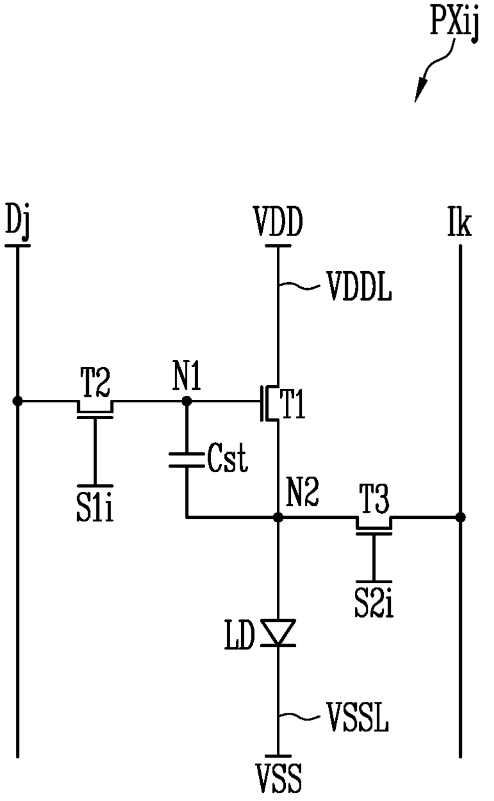
FIG. 12 is a diagram illustrating a pixel according to an embodiment of the present inventive concept.

FIG. 12 is a diagram illustrating a pixel according to an embodiment of the present inventive concept. FIG. 12 shows a pixel located on an i-th horizontal line and a j-th vertical line as an example.

Referring to FIG. 12, a pixel PXij according to an embodiment of the present inventive concept may include transistors T1 to T3, a storage capacitor Cst, and a light emitting element LD.

The light emitting element LD may be connected between the first power line VDDL to which the first power source VDD is supplied and the second power line VSSL to which the second power source VSS is supplied. For example, a first electrode (for example, an anode electrode) of the light emitting element LD may be connected to the first power line VDDL via a second node N2 and a first transistor T1, and a second electrode (for example, a cathode electrode) of the light emitting element LD may be connected to the second power line VSSL. The light emitting element LD may emit light with a luminance corresponding to the amount of current supplied from the first transistor T1.

During the normal driving period, the voltage of the first power source VDD and the voltage of the second power source VSS may have a predetermined potential difference so that the light emitting element LD emits light. That is, the voltage of the first power source VDD may be set to a higher voltage than that of the first driving power source VSS1.

During the protective driving period, the voltage of the first power source VDD and the voltage of the second power source VSS may have a predetermined potential difference so that the light emitting element LD emits light. That is, the voltage of the first power source VDD may be set to a higher voltage than that of the third driving power source VSS3.

During the sensing driving period, the voltage of the first power source VDD and the voltage of the second power source VSS may be set so that the light emitting element LD does not emit light. As an example, a potential difference between the first power source VDD and the second driving power source VSS2 may be set such that the light emitting element LD does not emit light.

The light emitting element LD may be an organic light emitting diode. In addition, the light emitting element LD may be an inorganic light emitting diode such as a micro light emitting diode (LED) or a quantum dot light emitting diode. In addition, the light emitting element LD may be an element composed of a combination of an organic material and an inorganic material. FIG. 12 shows a pixel PX including a single light emitting element LD as an example. However, in another embodiment, the pixel PX may include a plurality of light emitting elements, and the plurality of light emitting elements may be connected in series, in parallel, or in series and parallel.

The transistors T1, T2, and T3 may be composed of N-type transistors. In another embodiment, the transistors T1, T2, and T3 may be composed of P-type transistors. In another embodiment, the transistors T1, T2, and T3 may be composed of a combination of an N-type transistor and a P-type transistor. Each of the transistors may be configured in various forms such as a thin film transistor (TFT), a field effect transistor (FET), or a bipolar junction transistor (BJT).

The first transistor T1 may be connected between the first power line VDDL and the second node N2. A gate electrode of the first transistor T1 may be connected to a first node N1. The first transistor T1 may control the amount of current supplied from the first power source VDD to the second power source VSS via the light emitting element LD in response to a voltage of the first node N1. The first transistor T1 may be referred to as a driving transistor.

A second transistor T2 may be connected between a data line Dj and the first node N1. A gate electrode of the second transistor T2 may be connected to a first scan line S1*i*. The second transistor T2 may be turned on when the first scan signal is supplied to the first scan line S1*i* to electrically connect the data line Dj and the first node N1. The second transistor T2 may be referred to as a switching transistor.

A third transistor T3 may be connected between the second node N2 and a sensing line Ik, where k may be a natural number. A gate electrode of the third transistor T3 may be connected to a second scan line S2*i*. The third transistor T3 may be turned on when the second scan signal is supplied to the second scan line S2*i* to electrically connect the sensing line Ik and the second node N2. The third transistor T3 may be referred to as a sensing transistor.

The storage capacitor Cst may be connected between the first node N1 and the second node N2. The storage capacitor Cst may store a voltage corresponding to a voltage difference between the first node N1 and the second node N2.

Figure 13:
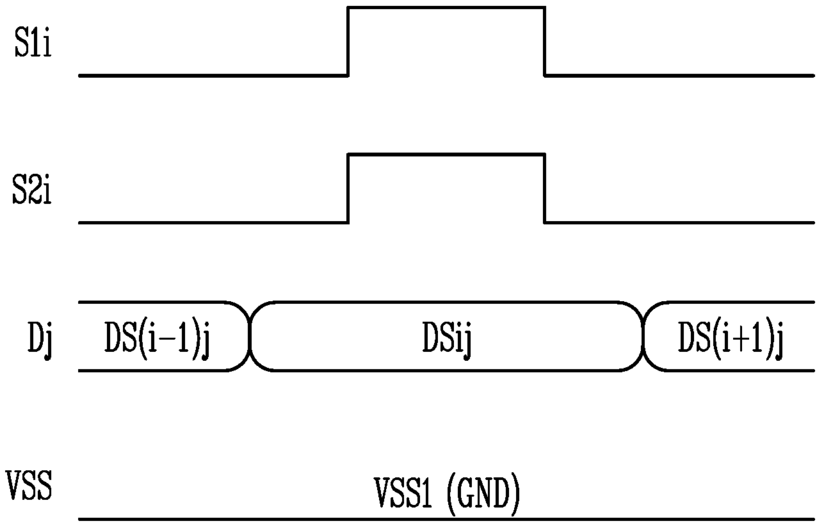
FIG. 13 is a diagram for explaining the normal driving period according to an embodiment of the present inventive concept.

FIG. 13 is a diagram for explaining the normal driving period according to an embodiment of the present inventive concept.

Referring to FIG. 13, during the normal driving period, the voltage of the initialization power source may be supplied to the sensing line Ik. During the normal driving period, data signals DS(i−1)j, DSij, and DS(i+1)j may be sequentially supplied to the data line Dj one row at a time.

In a corresponding pixel row, the first scan signal may be supplied to the first scan line S1*i* and the second scan signal may be supplied to the second scan line S2*i*. When the first scan signal is supplied to the first scan line S1*i*, the second transistor T2 may be turned on. When the second transistor T2 is turned on, the data line Dj and the first node N1 may be electrically connected to each other. In this case, the data signal DSij may be supplied to the first node N1 from the data line Dj.

When the second scan signal is supplied to the second scan line S2*i*, the third transistor T3 may be turned on. When the third transistor T3 is turned on, the sensing line Ik and the second node N2 may be electrically connected to each other. In this case, the voltage of the initialization power source may be supplied to the second node N2 from the sensing line Ik. In this case, a voltage corresponding to a voltage difference between the first node N1 and the second node N2 may be stored in the storage capacitor Cst. Here, the voltage of the initialization power source supplied to the second node N2 may be set to a constant voltage. Accordingly, the voltage stored in the storage capacitor Cst may be determined by a voltage of the data signal DSij.

After the voltage corresponding to the data signal DSij is stored in the storage capacitor Cst, the supply of the first scan signal to the first scan line S1*i* is stopped so that the second transistor T2 may be turned off, and the supply of the second scan signal to the second scan line S2*i* is stopped so that the third transistor T3 may be turned off.

Meanwhile, during the normal driving period, the second power source VSS may be set to the voltage of the first driving power source VSS1. Therefore, during the normal driving period, the current supplied from the first transistor T1 in response to the voltage stored in the storage capacitor Cst may be supplied to the second power source VSS via the light emitting element LD. Accordingly, the light emitting element LD may generate light having a predetermined luminance.

Figure 14:
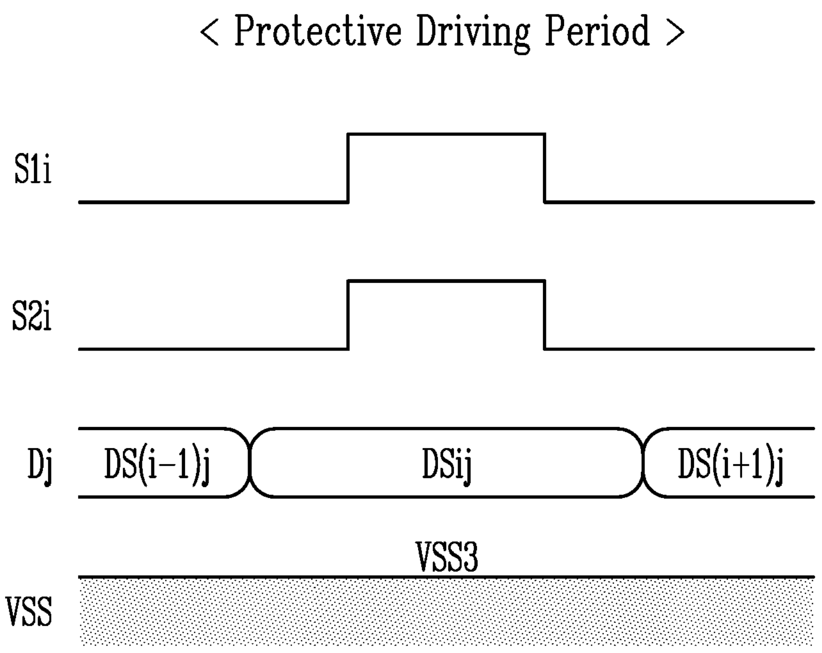
FIG. 14 is a diagram for explaining the protective driving period according to an embodiment of the present inventive concept.

FIG. 14 is a diagram for explaining the protective driving period according to an embodiment of the present inventive concept. In describing FIG. 14, detailed descriptions of configurations overlapping those of FIG. 13 will be omitted.

Referring to FIG. 14, during the protective driving period, the second power source VSS may be set to the voltage of the third driving power source VSS3. Here, a voltage value of the third driving power source VSS3 may be set so that the light emitting element LD emits light, and may be set to a higher voltage value than that of the first driving power source VSS1.

Therefore, during the protective driving period, the current supplied from the first transistor T1 may be supplied to the second power source VSS via the light emitting element LD. However, compared to the normal driving period, the second power source VSS may be set to a higher voltage (that is, the third driving power source VSS3), and thus the amount of current flowing through the light emitting element LD can be reduced.

That is, during the protective driving period, the voltage of the second power source VSS may be increased, and accordingly, the amount of current flowing through the pixels PX may be reduced. As such, when the amount of current flowing through the pixels PX is reduced, overcurrent flowing through the pixel unit 500 can be prevented. Also, since the pixels PX maintain a light emitting state during the protective driving period, deterioration in image quality can be minimized.

Figure 15:
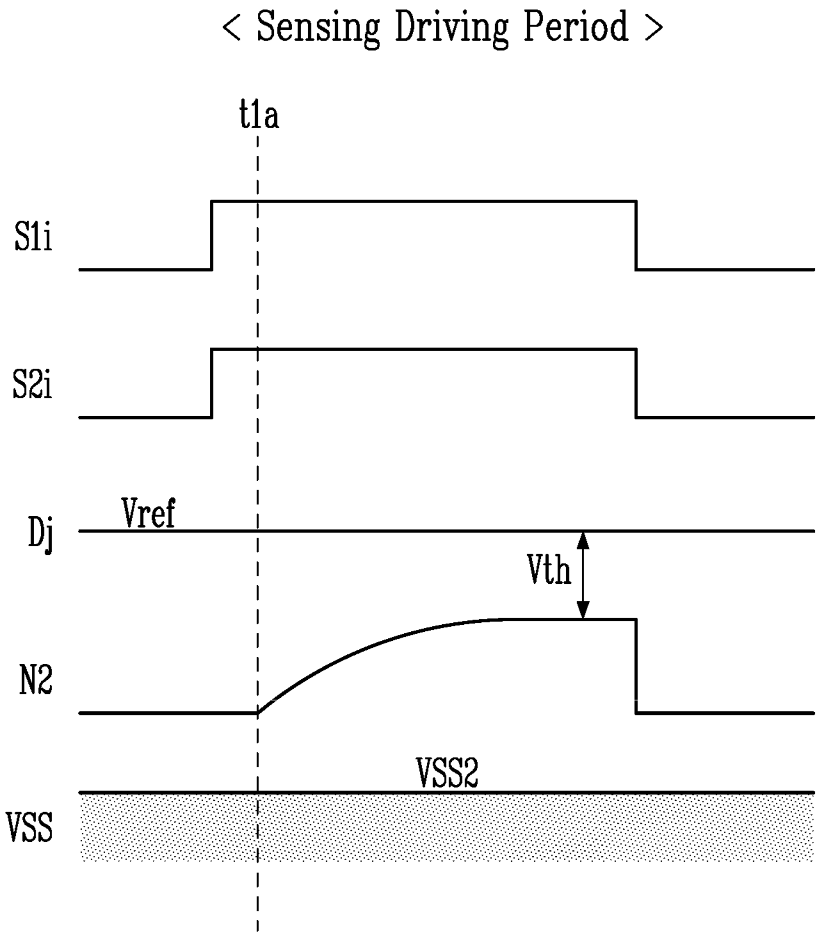
FIG. 15 is a diagram for explaining the sensing driving period according to an embodiment of the present inventive concept.

FIG. 15 is a diagram for explaining the sensing driving period according to an embodiment of the present inventive concept. FIG. 15 shows a period for sensing a threshold voltage of the first transistor T1.

Referring to FIG. 15, during the sensing driving period, a voltage of a reference power source Vref may be supplied to the data line Dj. The voltage of the reference power source Vref may be set so that the first transistor T1 is turned on.

During the sensing driving period, the first scan signal may be supplied to the first scan line S1*i* and the second scan signal may be supplied to the second scan line S2*i*. When the first scan signal is supplied to the first scan line S1*i*, the second transistor T2 may be turned on. Accordingly, the voltage of the reference power source Vref may be supplied to the first node N1.

When the second scan signal is supplied to the second scan line S2*i*, the third transistor T3 may be turned on. Accordingly, the voltage of the initialization power source may be supplied to the second node N2. Then, a voltage corresponding to a difference between the reference power source Vref and the initialization power source may be stored in the storage capacitor Cst.

Thereafter, at a first time point t1*a*, the supply of the voltage of the initialization power source to the sensing line Ik may be stopped. Then, voltages of the second node N2 and the third node N3 may be raised to a voltage obtained by subtracting a threshold voltage of the first transistor T1 from the reference power source Vref. Thereafter, the sensing unit 400 may determine threshold voltage information of the first transistor T1 using a voltage of the second node N2.

Meanwhile, during the sensing driving period, the second power source VSS may be set to the voltage of the second driving power source VSS2. Therefore, regardless of the voltage of the second node N2, the light emitting element LD may maintain a turned-off state. The sensing driving period may be included at a time point when the display device 10 (or an external system) is turned on and/or a time point when the display device 10 is turned off.

According to the display device and the method of driving the same according to the embodiments of the present inventive concept, when the current of the first power line quickly rises (rush current), it is possible to prevent overcurrent from flowing in the display device by increasing the voltage of the second power source supplied to the second power line.

In addition, according to the display device and the method of driving the same according to the embodiments of the present inventive concept, the first power source supplied through the first power line may be supplied from an external system (or set). Accordingly, the size of the printed circuit board can be minimized.

However, effects of the present inventive concept are not limited to the above-described effects, and may be variously extended without departing from the spirit and scope of the present inventive concept.

As described above, preferred embodiments of the present inventive concept have been described with reference to the drawings. However, those skilled in the art will appreciate that various modifications and changes can be made to the present inventive concept without departing from the spirit and scope of the inventive concept as set forth in the appended claims.

What is claimed is:

1. A display device comprising:

pixels connected to scan lines, data lines, sensing lines, a first power line connected to an anode of a light emitting element, and a second power line connected to a cathode of the light emitting element; and a power supply unit supplying at least one of a first driving power source, a second driving power source, and a third driving power source to the second power line as a second power source, wherein the power supply unit supplies voltages of the first driving power source to the second power line through a first transistor and an output of a third driving power generator connected to the first transistor for output of the third driving power source during a normal driving period in which the pixels emit light.

2. The display device of claim 1, wherein the first driving power source is set to a ground potential (GND).

3. The display device of claim 1, wherein the first power line receives a voltage of a first power source from an external system.

4. The display device of claim 3, wherein the voltage of the first power source is set to a higher voltage than those of the first driving power source and the third driving power source.

5. The display device of claim 1, wherein the power supply unit supplies a voltage of the second driving power source to the second power line during a sensing driving period in which characteristics of the pixels are sensed, and wherein the power supply unit supplies a voltage of the third driving power source to the second power line during a protective driving period for preventing overcurrent flowing through the first power line.

6. The display device of claim 5, wherein the voltage of the third driving power source is set higher than that of the first driving power source and lower than that of the second driving power source.

7. The display device of claim 6, wherein the voltage of the second driving power source is set such that the pixels do not emit light.

8. The display device of claim 6, wherein the voltage of the third driving power source is set so that the pixels maintain a light emitting state.

9. The display device of claim 5, wherein the power supply unit includes:

the first transistor connected between the second power line and the first driving power source;

the second driving power generator connected to the second power line and supplying the second driving power source; and the third driving power generator connected to the second power line and supplying the third driving power source.

10. The display device of claim 9, further comprising:

a current sensing unit sensing the amount of current of the first power line and outputting an alert signal in response to a sensed result;

a load determination unit determining a load of frame data input from an external system and outputting a load signal corresponding to a determined result; and a timing controller controlling the power supply unit in response to the alert signal and the load signal.

11. The display device of claim 10, wherein, when a load included in the load signal exceeds a predetermined threshold value, the timing controller sets the first transistor and the third driving power generator to be in an on state so that the display device is driven in the normal driving period regardless of the alert signal.

12. The display device of claim 10, wherein the current sensing unit receives a reference current and outputs an alert signal having an enable level when the amount of current of the first power line is equal to or greater than the reference current.

13. The display device of claim 12, wherein the timing controller sets the third driving power generator to be in an on state so that the display device is driven in the protective driving period for preventing overcurrent flowing through the first power line when the alert signal having the enable level is input and the voltage of the third driving power source is supplied to the second power line.

14. The display device of claim 12, wherein the timing controller sets the second driving power generator to be in an on state so that the voltage of the second driving power source is supplied to the second power line during a sensing driving period in which characteristics of a driving transistor included in the pixels are sensed.

15. A power supply system comprising:

a first transistor disposed between a first driving power source and a power line connected to a cathode of a light emitting element to supply a first driving power source to a panel;

a second driving power generator supplying a second driving power source to the power line; and a third driving power generator supplying a third driving power source to the power line, wherein the third driving power source has a voltage higher than that of the first driving power source and lower than that of the second driving power source.

16. A method of driving a display device including pixels that emit light when current flows from a first power line to a second power line, comprising:

supplying voltages of a first driving power source to the second power line and a third driving power generator outputting a third driving power source during a normal driving period in which the pixels emit light;

supplying a voltage of a second driving power source to the second power line during a sensing driving period in which information of a driving transistor included in the pixels is sensed; and supplying a voltage of the third driving power source to the second power line during a protective driving period for preventing overcurrent flowing through the first power line.

17. The method of claim 16, wherein the voltage of the third driving power source is higher than that of the first driving power source and lower than that of the second driving power source.

18. The method of claim 17, wherein the voltages of the first driving power source and the third driving power source are set such that the pixels emit light, and the voltage of the second driving power source is set such that the pixels do not emit light.

19. The method of claim 17, wherein the first driving power source is set to a ground potential (GND).

20. The method of claim 16, further comprising:

comparing the amount of current flowing through the first power line with a reference current; and driving in the protective driving period when the amount of current of the first power line is equal to or greater than the reference current.

* * * * *